(12) United States Patent
Tachikura et al.

(10) Patent No.: US 8,490,435 B2
(45) Date of Patent: Jul. 23, 2013

(54) OPTICAL FIBER END PROCESSING METHOD AND OPTICAL FIBER END PROCESSING APPARATUS

(75) Inventors: Masao Tachikura, Hitachi (JP); Hiroyuki Ohkubo, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 82 days.

(21) Appl. No.: 13/242,745

(22) Filed: Sep. 23, 2011

(65) Prior Publication Data

US 2012/0073331 A1 Mar. 29, 2012

(30) Foreign Application Priority Data

Sep. 29, 2010 (JP) ................................. 2010-218030

(51) Int. Cl.
*C03B 37/022* (2006.01)
(52) U.S. Cl.
USPC ................................. 65/501; 385/15; 385/53
(58) Field of Classification Search
USPC ........................................ 65/501; 385/15, 53
See application file for complete search history.

(56) References Cited

U.S. PATENT DOCUMENTS

2001/0019643 A1* 9/2001 Yamauchi et al. .............. 385/37

FOREIGN PATENT DOCUMENTS

| JP | 3130705 A | 6/1991 |
| JP | 4260007 A | 9/1992 |
| JP | 2001343549 A | 12/2001 |
| JP | 2003075676 A | 3/2003 |
| JP | 2003075677 A | 3/2003 |
| JP | 2004157355 A | 6/2004 |

OTHER PUBLICATIONS

Masao Tachikura, Fusion mass-splicing for optical fibers using electric discharges between two pairs of electrodes, Applied Optics, vol. 23, No. 3, pp. 492-498, Feb. 1984.
Masao Tachikura and Norio Kashima, Fusion mass-splices for optical fibers using high-frequency discharge, IEEE/OSA Journal of Lightwave Technology, vol. LT-2, No. 1, pp. 25-31, Feb. 1984.

* cited by examiner

*Primary Examiner* — Queenie Dehghan
(74) *Attorney, Agent, or Firm* — Marty Fleit; Paul D. Bianco; Fleit Gibbons Gutman Bongini Bianco PL

(57) ABSTRACT

There is provide an optical fiber end processing method, for processing an end portion of an optical fiber having a core and a clad surrounding the core, comprising: fixing two places of the optical fiber; firstly heating a part at a tip end side of the optical fiber between fixed parts fixed at two places, thereby melting the optical fiber at the heated part at the tip end side; secondly heating a part at a base end side of the optical fiber between the fixed parts away from the heated part at the tip end side in a state that the optical fiber is fixed at two places, thereby forming an expanded core region which is formed by expanding a diameter of the core by diffusing the dopant included in the optical fiber; and removing at least the heated part at the tip end side.

3 Claims, 3 Drawing Sheets

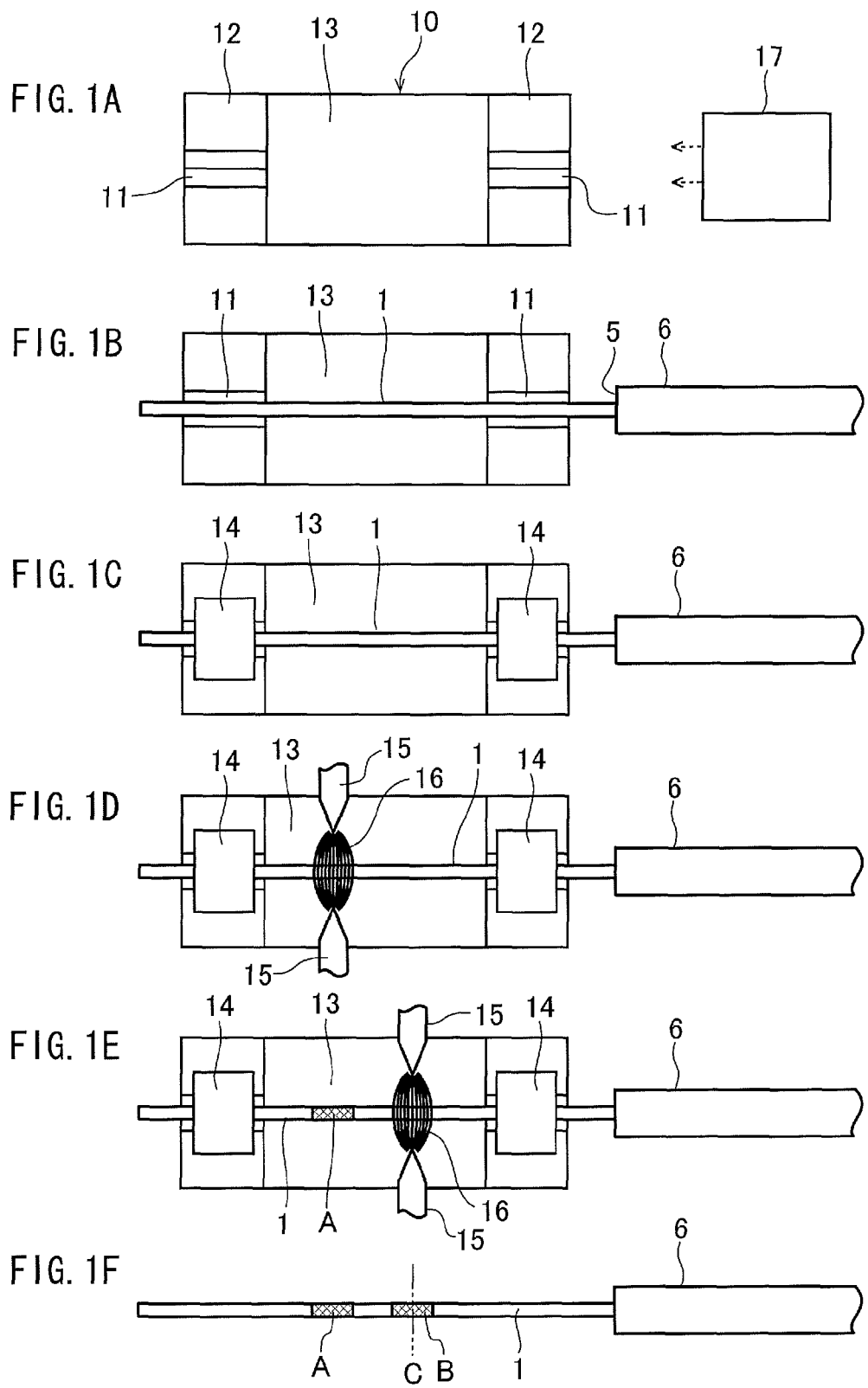

Vertical fine positioning    Horizontal fine positioning

OPTICAL FIBER END PROCESSING METHOD AND OPTICAL FIBER END PROCESSING APPARATUS

The present application is based on Japanese Patent Application No. 2010-218030, filed on Sep. 29, 2010, the entire contents of which are hereby incorporated by reference.

BACKGROUND OF THE INVENTION

1. Field of the Invention

The present invention relates to an optical fiber end processing method and an optical fiber processing apparatus, and further specifically relates to the optical fiber end processing method and the optical fiber end processing apparatus for fabricating an end portion of an optical fiber, with a mode field diameter (core diameter) expanded by thermally diffusing a dopant included in a core, etc., of an optical fiber.

2. Description of the Related Art

When single mode fibers with different mode field diameters are required to be connected or spliced, reduction of connection loss or splice loss is achieved by a technique of diffusing a dopant by applying heat treatment to an optical fiber end portion with smaller core diameter, and connecting (or splicing) the single mode fibers to make the mode field diameter comparable with that of another fiber. This technique is called TEC (Thermally diffused Expanded Core), and is effective not only for the connection of the optical fibers, but also for a case of connecting an optical fiber to an optical waveguide with a large mode field diameter. Further, in connecting to an optical transmission device including each kind of a lens as well, when the mode field diameter of the optical fiber is expanded, there is an advantage that an alignment of optical axes is facilitated.

According to patent document 1, dopant with smaller core diameter is diffused by heating a fusion-spliced part again after fusion-splicing, when fusion-splicing the optical fiber. However, in this method, the connection loss can not be reduced in some cases. As reasons thereof, it can be considered that dopants of both optical fibers are diffused by local heating using electric discharge during fusion-splice, and deformation of a core itself is generated by a pushing operation of the optical fibers during fusion and a flow caused by surface tension of the fusion-spliced part; deformation is generated in the fusion-spliced part of the optical fibers in a fusion state, which is caused by an angle deviation and misalignment of optical axes in the fusion-spliced optical fibers; and it is difficult to selectively heat only the optical fiber side with a smaller core diameter.

In order to improve the aforementioned method, patent document 2 discloses a technique of achieving a fusion splice using a resistive heating heater, and performing TEC processing using a burner. A wider range can be heated by the resistive heating heater rather than by electric discharge heating, and therefore local dopant diffusion at a fusion-spliced part and core deformation can be suppressed. Further, TEC heating using burner is carried out in a temperature range of not more than a temperature (approximately 1300° C. or less) of allowing the deformation to be generated due to softening of the optical fibers, and not less than a temperature (approximately 500° C. or more) of allowing the dopant of a core part to be diffused to a clad part, requiring a time of about 3 minutes to 10 minutes.

According to the method of the patent document 2, there is a phenomenon that strength of the optical fibers is reduced by a long-period heating when applying TEC heating. Therefore, according to patent document 3, anneal heating is performed using a resistive heating heater or a burner, with a fusion-spliced part as a center.

The aforementioned patent documents 1, 2 describe the TEC heating after fusion splice. However, patent document 3 and patent document 4 describe a technique of applying TEC processing to a coating removed part of the optical fiber, to thereby obtain a connecting end face by cutting or polishing the coating removed part. According to patent document 4, opposed gas burners are used for the TEC heating, so that the TEC heating is performed by operating the burners in a longitudinal direction of the optical fiber in a state of pulling both sides of the coating removed part of the optical fiber. Since the optical fiber is hardly bent, thus allowing the heating to be performed at a high temperature, and requiring only several minutes-heating even in a case of a typical single mode fiber, with Ge as a dopant.

Note that shortening of the heating time is a common problem in a TEC technique, and patent document 5 provides a structure of eliminating scanning of the burners by lengthening a shape of a gas injection hole of each burner in a longitudinal direction of the optical fiber, thus allowing the processing to be shortened to 30 minutes which is half of a conventional required time, at a heating temperature of 1150° C. Patent document 6 provides a structure of arranging a plurality of gas injection holes in a row or arranging them two-dimensionally, so that a plurality of optical fibers can be simultaneously processed.

Patent document 1:
Japanese Patent Laid Open Publication No. 1991-130705
Patent document 2:
Japanese Patent Laid Open Publication No. 2003-75676
Patent document 3:
Japanese Patent Laid Open Publication No. 2003-75677
Patent document 4:
Japanese Patent Laid Open Publication No. 1992-260007
Patent document 5:
Japanese Patent Laid Open Publication No. 2001-343549
Patent document 6:
Japanese Patent Laid Open Publication No. 2004-157355

As described above, in the technique of the patent documents 1 and 2 wherein TEC heating is applied after fusion-splice, disturbance/deformation of a core and deformation of the optical fiber itself are generated in the fusion-spliced part, and it is impossible to selectively heat only the optical fiber of one side with smaller core diameter. Therefore, there is a limit in reducing connection loss. Further, this technique is a technique limited to a case of performing the fusion splice.

Meanwhile, the method of the patent documents 3, 4, wherein TEC heating is applied to the coating removed part of the optical fiber by a gas burner before fusion splicing, involves a problem that much heating time is required, although not limited to the fusion splice and having a general purpose of use. Although depending on the kind of the dopant of the optical fiber and an amount of the diffusion, about several minutes to several tens minutes is required. This is because there is an essential constraint such that a heating temperature can not be set to be so high as inducing softening the optical fiber, for suppressing the deformation of the optical fiber. Namely, even if the optical fiber is pulled and straightened during TEC heating, a heated part of the optical fiber is stretched and is made thin if the heated part is softened by heating at a high temperature. Further, since a gripped portion, etc., of both sides of the coating removed part of the optical fiber is gripped, refuse such as coating residue is stuck to the gripped portion, thus sometimes generating the angle deviation and misalignment of optical axes in the optical fibers of the gripped portion at two places. In this case, the optical fiber is deformed and bent at a heated part which is softened by heating at a high temperature, thus generating a large loss. Even if such a heated part which is deformed by heating, is formed into a connection end face by cutting the heated part, the connection loss can not be reduced, and in addition, there is also a problem that such a heated part can not be inserted into a connector ferrule. Accordingly, there is no choice but carry out TEC heating requiring a lot of time at a low temperature, thus making it difficult to reduce a cost, and meanwhile, there is a large connection loss in the end face obtained by cutting a portion with expanded core diameter by applying TEC processing to the optical fiber at a high temperature, and therefore practical use is difficult.

BRIEF SUMMARY OF THE INVENTION

An object of the present invention is to provide an optical fiber end processing method and an optical fiber end processing apparatus capable of carrying out TEC heating at a high temperature and capable of obtaining an optical fiber end with low loss and expanded core diameter by thermal diffusion.

According to an aspect of the present invention, there is provided an optical fiber end processing method, for processing an end portion of an optical fiber having a core and a clad surrounding the core, and added with a dopant on at least either the core or the clad, for making a refractive index of the core relatively larger than a refractive index of the clad, comprising the steps of:

fixing two places of the optical fiber;

firstly heating a part at a tip end side of the optical fiber between fixed parts fixed at two places, thereby melting the optical fiber at the heated part at the tip end side after the fixing step;

secondly heating a part at a base end side of the optical fiber between the fixed parts away from the heated part at the tip end side in a state that the optical fiber is fixed at two places, thereby forming an expanded core region which is formed by expanding a diameter of the core by diffusing the dopant after the firstly heating step; and removing at least the heated part at the tip end side after the secondly heating step.

Preferably there is provided an optical fiber end processing apparatus that executes the optical fiber end processing method of claim 1, comprising:

a fiber fixing unit that fixes two places of the optical fiber;

a heating unit that heats the optical fiber; and a controller that controls a heating operation of heating a different part of the optical fiber between the fixed parts of two places fixed by the fiber fixing unit, using the heating unit.

According to other aspect of the present invention, there is provided an optical fiber end processing method, for processing an end portion of an optical fiber having a core and a clad the core, and added with a dopant on at least either the core or the clad, for making a refractive index of the core relatively larger than a refractive index of the clad, comprising the steps of:

fixing the optical fiber and a supporting fiber, with each end face opposed to each other;

firstly heating the optical fiber and the supporting fiber so as to be fusion-spliced with each other after the fixing step;

secondly heating the optical fiber positioned away from the fusion-spliced part and positioned between a fixed part and the fusion-spliced part of the optical fiber, thereby forming an expanded core region which is formed by expanding a diameter of the core by diffusing the dopant after the firstly heating step; and removing at least the heated part at the tip end side after the secondly heating step.

Preferably, there is provided an optical fiber end processing apparatus that executes the optical fiber end processing method of claim 2, comprising:

a fiber fixing unit that fixes the optical fiber and the supporting fiber respectively;

a heating unit that heats the optical fiber and the supporting fiber; and a controller that controls a heating operation of heating a different part of the optical fiber and the supporting fiber fixed by the fiber fixing unit, using the heating unit.

BRIEF DESCRIPTION OF THE DRAWINGS

FIG. 1A to FIG. 1F are plan views showing a processing step of an optical fiber end processing method respectively according to a first embodiment of the present invention.

DETAILED DESCRIPTION OF THE INVENTION

Figure 2A:
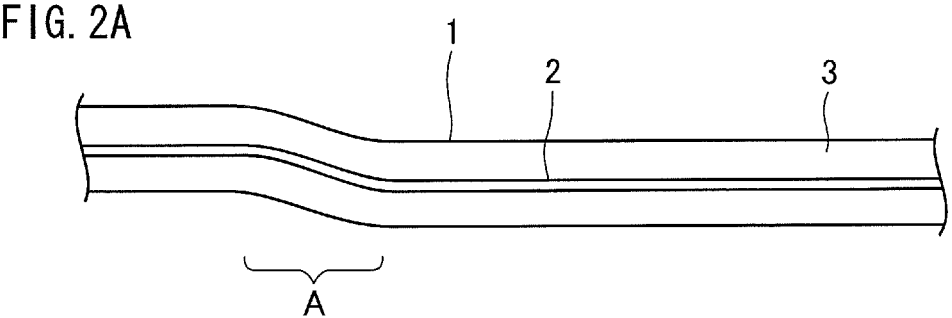
FIG. 2A and FIG. 2B are explanatory views for explaining a processing principle of the optical fiber end processing method according to a first embodiment of the present invention.

An optical fiber end processing method and an optical fiber end processing apparatus according to an embodiment of the present invention will be described hereafter.

First Embodiment

FIG. 1A to FIG. 1F show each step of an optical fiber end processing method according to a first embodiment of the present invention, and is a plan view of an optical fiber end processing apparatus viewed from above, using the optical fiber end processing apparatus.

FIG. 1A shows a V-groove component for fixing the end portion of the optical fiber. V-groove parts 12, being fixing parts, having V-grooves 11 for placing the optical fiber thereon, are formed on both ends of the V-groove component 10. An interspace (opening) 13 for performing a heating work to the optical fiber, is formed between the V-grooves 12 and 12. The V-groove component 10 with this structure is equivalent to the V-groove component of integrated precision machining having an opening in the center, which is used for a commercially available optical fiber fusion splicer. V-grooves 11 and 11 of both ends of the V-groove component 10 are precisely machined so as not to allow positional deviation to occur from each other, and when optical fibers are placed on the V-grooves 11 and 11 at both sides respectively, axes of two optical fibers are aligned with each other. In addition, fusion splicers of recent years include a V-groove component in which a plurality of V-groove parts are formed so that a multi-fiber ribbon can also be connected. Such a V-groove component with a plurality of V-grooves formed therein may also be used. The optical fiber end processing apparatus has a discharging electrode, being a heating unit that heats the holey fiber 1, and as shown in FIG. 1A, has a control unit 17 that controls a discharge heating operation by the discharging electrode. Note that in FIG. 1B to FIG. 1F, the control unit 17 is not shown.

As shown in FIG. 2A, an optical fiber 1 has a core 2 in which for example a dopant such as Ge is added to a silica-based material for increasing a refractive index, and has a clad 3 surrounding the core 2. As shown in FIG. 1B, the optical fiber 1 is used in a state of being coated on the clad 3 with a coating 5. The coating 5 of a fiber coating part 6 needs to be removed, when optical fibers are connected or spliced to each other, or when optical fibers are connected to optical components. When TEC (Thermally diffused Expanded Core) is processed as well, as shown in FIG. 1B, the end portion of the optical fiber 1 in a bared state from which the coating 5 of the fiber coating part 6 is removed, is respectively fitted into the V-grooves 11, 11 at both sides with an interspace 13 interposed between them. Note that the fiber coating part 6 is fixed to a support so as not to be moved, it is omitted in FIG. 1B to FIG. 1E.

Next, as shown in FIG. 1C, the optical fiber 1 is supported and fixed by V-groove pressing members 14 so that the optical fiber 1 can be received by the V-grooves 11, 11 at both sides. When the optical fiber 1 of the interspace 13 between the V-grooves 11 and 11 is heated and melted, the optical fiber 1 in a melted state is likely to be shrunk by surface tension, and therefore the optical fiber 1 needs to be surely fixed by the V-groove pressing members 14, against such a shrinking.

Next, the optical fiber 1 between the V-grooves 11 and 11 is heated by electric discharge. Such an electric discharge heating is performed by arranging, for example, a pair of discharging electrodes 15, 15 in the interspace 13. A discharge plasma region 16 is formed between discharging electrodes 15 and 15, to thereby heat the optical fiber 1 in the discharge plasma region 16. A discharge circuit equivalent to a commercially available fusion splicer may be connected to the discharging electrodes 15, 15.

As shown in FIG. 1D, the tip end side part of the optical fiber 1 in the optical fiber 1 between the V-grooves 11, 11 fixed by the V-groove pressing members 14, is heated by first electric discharge heating, to thereby obtain a deformable state of the optical fiber 1 at this heated part by being melted.

At this time, if the refuse such as coating 5 removed from the fiber coating part 6 is stuck to each V-groove or V-groove pressing member 14, the optical fiber 1 is gripped between the V-groove parts 12 and 12 at both sides of the optical fiber 1 in a state that the angle deviation and misalignment of optical axes occur, thus generating a stress in the optical fiber 1 (further, the axial deviation and misalignment of the optical axes are sometimes generated depending on the precision of the V-groove 11 itself of the V-groove part 12, and by incompleteness of the V-groove pressing member 14). Therefore, a thermally melted part melted by heating the optical fiber 1 by electric discharge, is deformed to relax the stress of a non-melted part. After relaxing the stress by sufficient heating, the electric discharge is stopped.

Figure 2B:
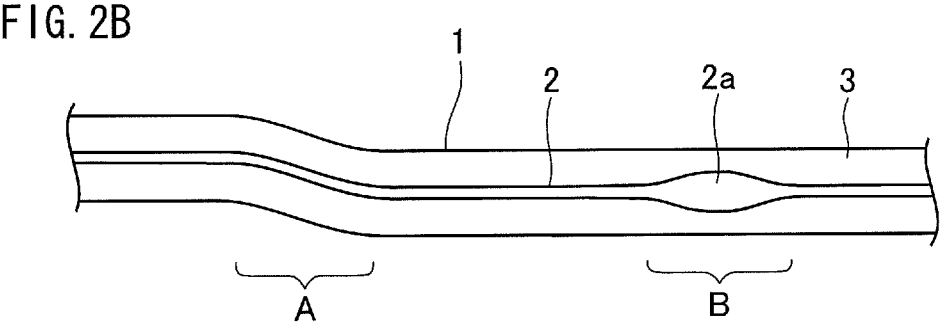

Deformation of the thermally melted part will be further described by using FIG. 2A and FIG. 2B, being explanatory views of a processing principle. FIG. 2A and FIG. 2B are schematic views showing a case that the misalignment of optical axes occurs in the V-groove parts 12, 12 at both sides of the optical fiber. FIG. 2A shows a state after executing the aforementioned first electric discharge heating. Deformation is generated in a thermally melted region A, being a tip end side heated part of the optical fiber 1. As a result of melting the thermally melted region A by electric discharge heating, deformation of an amount of misalignment is generated in this part, thus relaxing the stress in the optical fiber 1 which is gripped in a misaligned state. Therefore, when the electric discharge is ended, the stress in the optical fiber 1 between the V-grooves 12 and 12 is relaxed over an entire optical fiber 1. Owing to relax of the stress, the optical fiber 1 at the base end side of the thermally melted region A (right side in FIG. 2A) is straightened and set in a state of no stress.

Next, as shown in FIG. 1E, the discharging electrode 15 is shifted to the right side (base end side of the optical fiber 1), and electric discharge heating is executed to perform TEC processing. In this second electric discharge heating, a part at the base end side of the optical fiber 1, which is away from the thermally melted region A, is heated so that the thermally melted region A is not melted again. Then, the dopant added to the core 2 is diffused and the diameter of the core 2 is expanded. As shown in FIG. 2B, an expanded core part 2a, with a mode field diameter (core diameter) of the optical fiber 1 expanded, is formed in a thermally expanded core region (expanded core region) B which is formed by the second electric discharge heating.

Large deformation occurs when a fixture state of the optical fiber 1 is poor due to misalignment of the optical axes between fixed parts of the optical fiber 1, and a large loss is generated when light passes therethrough. Meanwhile, in the thermally expanded core region B of a second heated part, the optical fiber 1 is straight with no stress. Therefore, even if the optical fiber 1 is heated up to a softening point or more and is set in a melted state, the optical fiber 1 is still in a straight state without allowing the deformation to occur. Diffusion of the dopant is extraordinarily large and therefore the mode field diameter can be expanded in a short heating time at a high temperature allowing the optical fiber 1 to be melted. FIG. 2B shows a state after executing the second electric discharge heating. The optical fiber 1 is in a state of no stress, and therefore only the surface tension is added to the optical fiber 1, even if the optical fiber 1 is melted. Therefore, straightness of the center of the core 2 of the optical fiber 1 is maintained, thus making it possible to prevent an increase of a loss in the expanded core part 2a, when the light is propagated.

Thus, core expansion processing can be surely applied to the end portion of the optical fiber 1 in a short time, and therefore such a core expansion processing is useful for the purpose of use of a connection/splice to an optical fiber or an optical waveguide and other optical transmission devices with different mode field diameters.

In addition, electric discharge heating can be automatically executed by providing a controller 17 that controls an electric discharge heating operation for heating a different part of the optical fiber 1 between the V-grooves 11 and 11 at two places fixed by the V-groove component 10, by electric discharging electrodes 15, 15, and by setting an operation program in the controller 17 for continuously executing the electric discharge heating operation twice as described above.

Next, the optical fiber 1 is cut for removing the thermally melted region A.

In a case of the fusion splice or mechanical splice, as shown in FIG. 1F, when the optical fiber 1 is cut at a cut position C positioned in the thermally expanded core region B so that an end face is formed into a smooth face, the expanded core part 2a can be positioned on a splicing end face of the optical fiber 1.

Further, when a general operation of connecting a connector is performed, a cut position is set to a position shifted to the tip end side of the fiber (at least the thermally melted region A may be removed, and a cutting operation is performed at a position between the thermally melted region A and the thermally expanded core region B, or within the thermally expanded core region B). Then, after the optical fiber is attached to a connector ferrule, an extra length is removed by polishing, etc., and a final fiber end face after polishing is positioned at the expanded core part 2a. Therefore, when the connector is attached, quality of a cut face is not necessary, and precision of a cut position is not necessary, either. Thus, the cut position is set so as not to include the thermally melted region A. When the connector is attached, positioning of the fiber end face is automatically achieved by setting a position of the electric discharging electrode 15, so that a length from a coating edge of the fiber coating part 6 to a center of the thermally expanded core region B is a specified value.

Figure 3:
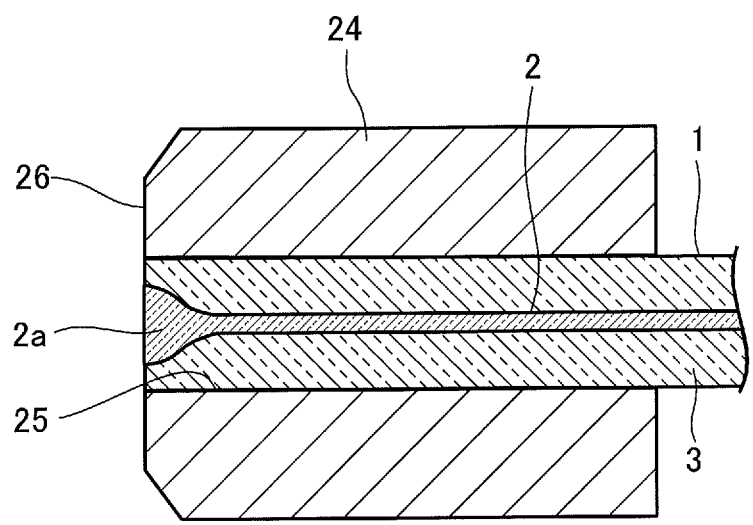
FIG. 3 is a sectional view of the optical fiber end processing method according to an embodiment of the present invention, wherein an expanded core part is formed on an end portion of the optical fiber by the optical fiber end processing method, and such an end portion of the optical fiber is attached to a ferrule.

FIG. 3 shows an embodiment of the optical fiber end processing method of fitting a ferrule 24 into the end portion of the optical fiber 1. The optical fiber 1 after undergoing the end face processing is inserted into a fiber guiding hole 25 of the ferrule 24 and adhered and fixed thereto, and thereafter an end face 26 of the ferrule is polished. The expanded core part 2a in the center of the thermally expanded core region B is positioned on the end face 26 of the ferrule after polishing. Although not shown, the ferrule 24 of FIG. 3 has a portion for holding the fiber coating part 6.

When the optical fiber 1 after TEC processing is applied to fusion splice and mechanical splice, or a connector for onsite attachment in which the mechanical splice is incorporated, the center of the thermally expanded core region B is preferably formed as a splicing end face, and therefore the aforementioned cut position C is selected to be approximately the center of the thermally expanded core region B, and a smooth end face is formed by cutting the optical fiber 1. At this time, in order to allow a variation of the cut position, the thermally expanded core region B obtained by applying TEC processing is preferably set to be long.

According to the aforementioned embodiment, the portion of the optical fiber 1, being a bare fiber, is gripped by the V-groove 11. However, as is employed by a conventional TEC processing, the fiber coating parts 6 at both sides of the optical fiber 1 may be gripped, with a part of the coating 5 removed while leaving the fiber coating part 6 of the tip end part. In this case, misalignment of optical axes is absolutely generated in the optical fiber 1 at both gripped portions, and therefore conventionally the optical fiber is not melted by limiting a heating temperature of the optical fiber. However, in this embodiment, the misalignment of optical axes, etc., is absorbed in the thermally melted region A, and therefore the optical fiber can be melted by heating.

Further, in this embodiment, the thermally melted region A and the thermally expanded core region B are desirably not overlapped on each other. The reason thereof is considered as follows. The thermally melted region A is deformed in a range of a certain length, and therefore when a part of the thermally expanded core region B is overlapped thereon, there is a slight possibility that deformation of the thermally melted region A extends to the thermally expanded core region B, when the secondly heating for TEC is carried out.

Further, the expanded core part 2a formed by thermal diffusion of dopant, is formed into a taper shape so that a core diameter is gradually decreased as it is away from the connector or splicing end face, for reducing the connection loss or splice loss. In addition, the region of the expanded core part 2a is preferably set to long. In order to obtain a long expanded core part 2a, a heating region is moved by moving the electric discharging electrode 15, to thereby expand the length of the fiber for diffusing the dopant. In order to form a taper-shaped core, there is a method of gradually shortening a substantial heating time toward both sides from the center of the thermally expanded core region B by varying a moving speed of the discharging electrode 15, and varying an amplitude of the discharging electrode 15 while making it carry out reciprocating motion. Further, the taper shape may be adjusted by adjusting a diffusion amount of the dopant at each position, by varying the electric discharging current depending on the position of the discharging electrode 15.

Further, the discharge plasma region 16 may be expanded without moving the discharging electrode 15. At this time, it is effective to enlarge an electrode interval between discharging electrodes 15 and 15, or shift the discharging electrode 15 in a direction vertical to a paper face of FIG. 1D and FIG. 1E. When the discharging electrode 15 is shifted in the vertical direction, a pair of discharging electrodes 15 and 15 are heated from one side of the optical fiber 1. Therefore, it is effective for a stable heating, that a pair of discharging electrodes are disposed at the other side as well, so that the optical fiber 1 is simultaneously heated from both sides of the optical fiber 1, by two pairs of discharging electrodes.

Non-patent document 1 describes the fusion splice technique using the two pairs of discharging electrodes, which is published by the Optical Society of America (OSA). Further, processing of a single optical fiber has been described heretofore. However, an optical fiber ribbon obtained by making a plurality of optical fibers into a tape, can also be realized by a completely same method, only if the number of V-grooves is increased. At this time, all optical fibers need to be uniformly heated. However, this is a publicly-known technique already realized by a fusion splicer. The method of using two pairs of discharging electrodes for the optical fiber ribbon, is described in the non-patent document 1, and the method of using a pair of discharging electrodes is described in the non-patent document 2. (Non-patent document 1) M. Tachikura: "Fusion mass-splicing for optical fibers using electric discharges between two pairs of electrodes", Applied Optics, Vol. 23, No. 3, pp. 492-498 (February 1984). (Non-patent document 2) M. Tachikura and N. Kashima: "Fusion mass-splices for optical fibers using high-frequency discharge", IEEE/OSA Journal of Lightwave Technology, Vol. LT-2, No. 1, pp. 25-31 (February 1984).

Second Embodiment

According to the second embodiment of the present invention, the optical fiber end processing is performed by using a supporting fiber, in addition to the optical fiber which is subjected to TEC processing.

FIG. 4A to FIG. 4E show each step of the optical fiber end processing according to the second embodiment of the present invention, and are sectional views of the vicinity of a processing part of the optical fiber end, using an optical fiber end processing apparatus.

Figure 4A:
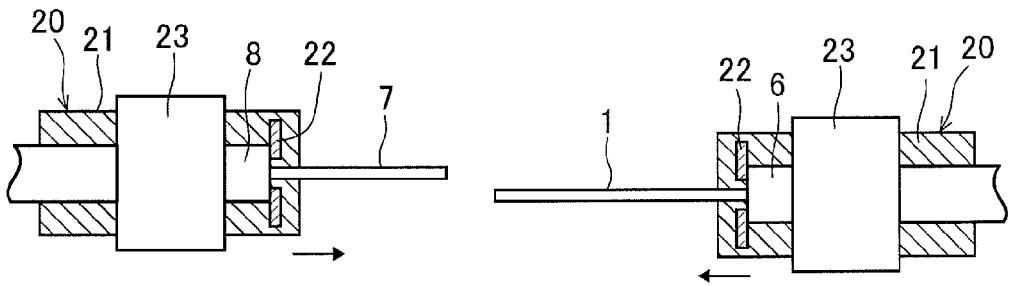
FIG. 4A to FIG. 4E are sectional views showing each processing step of the optical fiber end processing method according to a second embodiment of the present invention.

First, as shown in FIG. 4A, the optical fiber 1 with the same structure as the first embodiment, being a target of the TEC processing, and a quartz-based supporting fiber 7 are attached to the optical fiber end processing apparatus. In this embodiment, a commercially available fusion splicer with aligning function is used as the optical fiber end processing apparatus. The optical fiber 1 and the supporting fiber 7 are attached to the fusion splicer after removing the coating of the end portions of the fiber coating parts 6 and 8 respectively. The supporting fiber 7 is used for mechanically supporting the optical fiber 1 during TEC heating, after being fusion-spliced to the optical fiber 1, and there is no particular request in optical characteristics. Accordingly, any kind of fiber may be selected as the supporting fiber 7, and for example, a silica glass rod (silica glass fiber) without core may be selected.

The fusion splicer includes a system in which the fiber coating part is directly attached to a finely adjusting base.

However, explanation will be given here based on a system in which the fiber coating part is attached to a finely adjusting base after being attached to a fiber holder 20 of the fusion splicer. The fiber coating part 6 of the optical fiber 1 and the fiber coating part 8 of the supporting fiber 7 are respectively attached to the fiber holder 20. A fiber stopper 22 is formed on a fiber holder body 21 of the fiber holder 20, and positioning of a coating edge is carried out by bringing the coating edge of the fiber coating parts 6 and 8 into contact with the fiber stopper 22. Designation mark 23 indicates a fiber clamp for pressing the fiber coating parts 6, 8 against the fiber holder body 21. As shown in FIG. 4A, axes of the fibers 1 and 7 are largely deviated from each other in a state immediately after attaching both fibers 1, 7 to the fiber holder 20. Therefore, first, as pre-processing of alignment of optical axes, end faces of both fibers 1 and 7 are closely approached to each other, based on image data obtained by a camera.

Figure 4B:
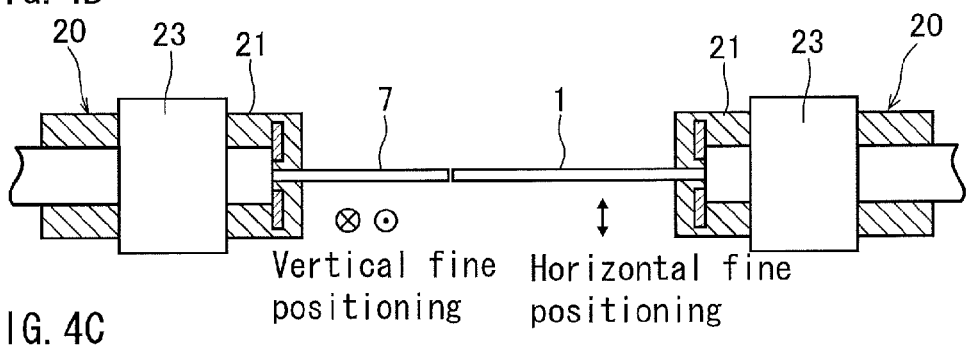

FIG. 4B shows a next alignment state of optical axes. The optical axes are automatically adjusted based on the image data of outer shapes of the fibers 1 and 7 obtained by the camera. FIG. 4B shows a state that the optical axes are adjusted by finely horizontally moving the optical fiber 1 attached to a right side fiber holder 20 in a vertical direction of FIG. 4B, and in parallel to a paper face, and finely vertically moving the supporting fiber 7 attached to a left side fiber holder 20 in a direction vertical to the paper face.

Figure 4C:
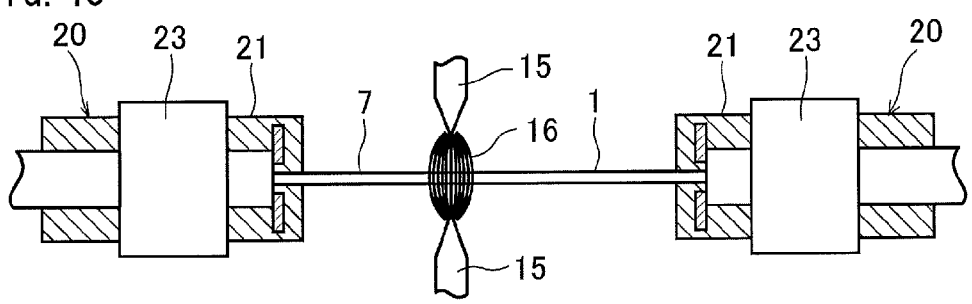

Thereafter, as shown in FIG. 4C, the optical fiber 1 and the supporting fiber 7 are fusion-spliced to each other. In the fusion-splice, similarly to the first embodiment, for example a pair of discharge electrodes 15 are used, to thereby heat the fusion-spliced part in the discharge plasma region 16 formed between the discharge electrodes 15 and 15. An optical performance of a fusion-spliced part thus heated and melted is not required, and therefore delicate adjustment of the condition during fusion-splice is not necessary. Electric discharge may be maintained until a flow of a fiber fusion part is ended, which is caused by heating the fusion-spliced part. The electric discharge may be maintained for only several seconds under an ordinary fusion-splicing condition. When an angle deviation and misalignment of optical axes occur between the optical fiber 1 and the supporting fiber 7, deformation is generated in a thermally melted connection region D of the fusion-spliced part.

Figure 4D:
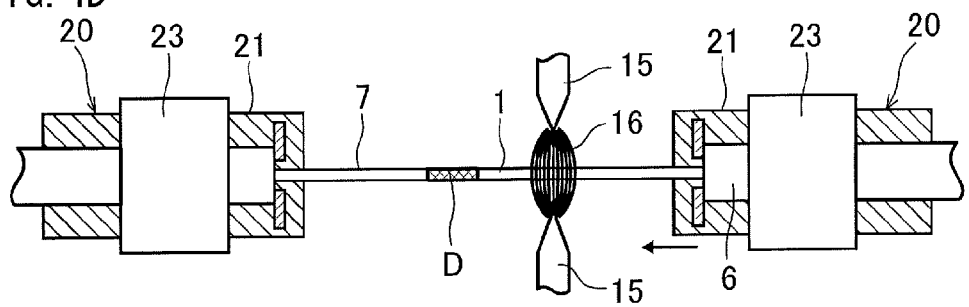

Next, as shown in FIG. 4D, the discharge electrodes 15 are respectively moved to a part of the optical fiber 1 away from the thermally melted connection region D in a base end side direction (right side direction in FIG. 4D) of the optical fiber 1, and TEC heating is carried out by electric discharge, so that the thermally melted splice region D is not melted again. Owing to the second heating, similarly to the first embodiment, the expanded core part 2a with expanded mode field diameter (core diameter) of the optical fiber 1, is formed in the thermally expanded core region B.

Figure 4E:
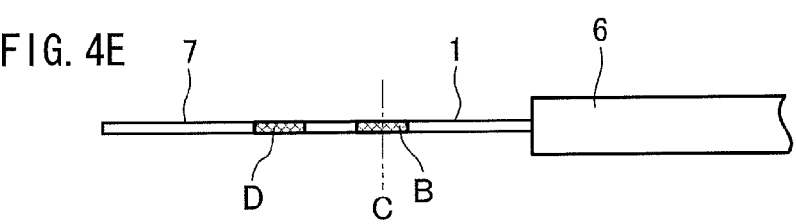

Thereafter, as shown in FIG. 4E, the optical fiber 1 is preferably cut approximately in the center of the thermally expanded core region B, so that the expanded core part 2a is positioned on the end face of the optical fiber 1. However, as is described in the first embodiment, when the attachment of connector is presupposed, the optical fiber 1 is preferably cut at a position in consideration of a polishing amount so that the end face of the fiber is formed as the expanded core part 2a after polishing the end face of the ferrule.

A moving operation of the discharge electrode 15 according to the first and second embodiments is enabled by the commercially available fusion splicer with adjusting function of optical axes. The fusion splicer with adjusting function of optical axes has a function of so-called sweep discharge, and by reciprocating the discharging electrode 15 after fusion-splice using the aforementioned function, heating treatment can be applied to the optical fiber 1. Further, the discharge heating according to the aforementioned embodiment can be automatically executed by the fusion splicer by slightly changing an operation program of the fusion splicer. TEC region can also be easily expanded similarly by changing the operation program, namely, by heating the optical fiber 1 during second discharge heating thereof, while shifting the discharging electrode 15. Moreover, positional information of the coating edge of the fiber coating part 6 is already known by the fusion splicer, because the fiber stopper 22 is provided in the fiber holder 20. Therefore, the length from the coating edge of the fiber coating part 6 to the center of the thermally expanded core region B can be accurately controlled. Further, cut operation is possible by a commercially available optical fiber cutter in a state that the fiber coating part is fitted into the fiber holder of the fusion splicer, and therefore a cut position with high precision can be obtained.

In the explanation for the aforementioned first and second embodiments, explanation is given for a case that electronic discharge is used for heating the optical fiber. However, a carbon dioxide laser, a resistance heating heater, or a gas burner, etc., utilized for fusion splice in addition to the electric discharge, can also be utilized as a heat source. When the resistance heating heater is used, a heated region is wide. Therefore, it is not necessary to move the heat source during discharge heating, like the TEC processing. However, excessively wide heated region involves a problem that the melted part is deformed by gravity. Therefore, in this case, the optical fiber is vertically set, and is heated by the resistance heating heater. Further, when the gas burner is used, preferably burners are disposed so as to be opposed to each other at both sides of the optical fiber, so that a heated portion of the optical fiber is not deformed by a wind pressure of gas, to thereby cancel the wind pressure of the burner.

Further, in the aforementioned embodiments, explanation is given for the optical fiber end processing method and the end processing apparatus using the optical fiber 1 composed of the core 2 with dopant such as Ge added to the silica-based material for increasing the refractive index, and the clad 3 formed around the core 2. However, the optical fiber end processing method and the optical fiber end processing apparatus of the present invention can also be applied as it is, to the optical fiber of a type that dopant such as fluorine is added to the clad 3 for reducing the refractive index and the core 2 is made of pure silica glass without dopant.

Even in a case of the optical fiber 1 with dopant added to the clad 3, similarly to the first and second embodiments, the base end side part of the optical fiber 1 away from the thermally melted region A is heated, so that the thermally melted region A is not melted again during second discharge heating. Thus, the dopant added to the clad 3 is diffused to outside of the optical fiber 1, and the dopant in the optical fiber 1 is reduced. Therefore, the region of the clad 3 is reduced, and the region of the core 2 is expanded. The expanded core part 2a, with mode field diameter of the optical fiber 1 (core diameter) expanded, is formed in the thermally expanded core region (expanded core region) B which is expanded by second discharge heating.

After end of the second discharge heating step, similarly to the first and second embodiments, the optical fiber 1 is cut in consideration of the positioning of the expanded core part 2a so that the expanded core part 2a is positioned on the connector or splicing end face of the optical fiber 1.

Further, according to the aforementioned embodiment, dopant such as fluorine for reducing the refractive index is added to the clad 3, and an optical fiber of a type that the core 2 is made of pure silica glass without dopant is used. However, the optical fiber end processing method and the optical fiber end processing apparatus of the present invention can also be applied as it is, to the optical fiber composed of the core 2 with dopant such as Ge added to a silica-based material for increasing the refractive index, and the clad 3 added with dopant such as fluorine for reducing the refractive index.

What is claimed is:

1. An optical fiber end processing method, for processing an end portion of an optical fiber having a core and a clad surrounding the core, and added with a dopant on at least either the core or the clad, for making a refractive index of the core relatively larger than a refractive index of the clad, comprising the steps of:

fixing two places of the optical fiber;

firstly heating a part at a tip end side of the optical fiber between fixed parts fixed at two places, thereby melting the optical fiber at the heated part at the tip end side after the fixing step;

secondly heating a part at a base end side of the optical fiber between the fixed parts away from the heated part at the tip end side in a state that the optical fiber is fixed at two places, thereby forming an expanded core region which is formed by expanding a diameter of the core by diffusing the dopant after the firstly heating step; and removing at least the heated part at the tip end side from the optical fiber by cutting, after then secondly heating step.

2. The optical fiber end processing method according to claim 1, wherein in the secondly heating step, a length of the expanded core region is expanded by moving a heating position of the optical fiber.

3. The optical fiber end processing method according to claim 1, wherein a new end portion of the remaining optical fiber processed by the optical fiber end processing method of claim 1, is inserted into a ferrule and adhesion-fixed thereto, and thereafter an end face of the ferrule is polished, such that the expanded core region is positioned on the end face of the ferrule after polishing.

* * * * *